3,122,579
MIXED TRISILOXANES
Robert H. Leitheiser, Midland, Mich., assignor to Dow Corning Corporation, Midland, Mich., a corporation of Michigan
No Drawing. Filed Oct. 17, 1960, Ser. No. 62,825
3 Claims. (Cl. 260—448.2)

This invention relates to hydrolyzable trisiloxanes and to trisiloxanediols containing at least two kinds of siloxane units.

One of the most important advances in the last two decades in the art of elastomeric materials has been the development of organopolysiloxane rubbers. One of the best ways of preparing organopolysiloxane rubber gums is by the polymerization of the corresponding cyclotrisiloxanes. The present invention relates to intermediates for use in the preparation of mixed cyclotrisiloxanes. The materials of this invention open up new possibilities in the preparation of siloxanes containing more than one kind of siloxane unit because mixed cyclotrisiloxanes offer a convenient way of introducing various kinds of siloxane units into siloxane rubber polymers. Since most commercial siloxane rubber polymers are copolymers containing at least two different kinds of siloxane units, the compositions of this invention contribute substantially to the art of silicone rubber manufacture.

It is the object of this invention to prepare novel compositions of matter which are useful in the preparation of cyclicorganopolysiloxanes as specifically disclosed and claimed in applicant's copending application entitled A Method of Making Cyclotrisiloxanes, Serial Number 62,895, filed October 17, 1961, now abandoned. Another object is to prepare novel trisiloxanediols and trisiloxane methoxides which can be polymerized via hydroxyl condensation or hydroxylmethoxy condensation to produce organopolysiloxane gums. Other objects and advantages will be apparent in the following description.

This invention relates to linear organosiloxanes of the formula $$\begin{matrix} & R_2 & R_2 & R_2 \\ X\text{Si} & \text{O}\text{Si} & \text{O}\text{Si}X \end{matrix}$$

in which X is of the group chlorine, acetoxy, methoxy, and hydroxyl and R is selected from the group consisting of monovalent hydrocarbon radicals and monovalent halohydrocarbon radicals, in which siloxane the R group attached to at least one of the silicon atoms is different from the other R groups.

As can be seen, the above definition requires that there be at least two different kinds of siloxane units in the trisiloxane. There can, of course, be three different kinds of siloxane units. It can also be seen that all of the R groups, except one, can be the same. On the other hand, all of the R groups can be different. Examples of typical variations are illustrated specifically by the compounds $$\begin{matrix} & Me_2 & Me_2 & Me \\ ClSi & OSi & OSiCl \\ & & & Ph \end{matrix}$$

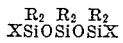

$$\begin{matrix} & Me & Et \\ ClSiOSi & OSiCl \\ Ph & Vi \end{matrix}$$

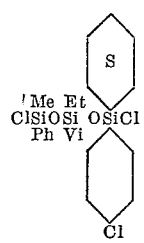

$$\begin{matrix} & Me_2 & Ph_2 & Et_2 \\ ClSi & OSi & OSi & Cl \end{matrix}$$

and $$\begin{matrix} & Ph & Me_2 & Me \\ ClSi & OSi & OSiCl \\ & Me & & Ph \end{matrix}$$

For the purpose of this invention R can be any monovalent hydrocarbon radical, such as alkyl radicals such as methyl, ethyl, isopropyl, octadecyl or myricyl; any unsaturated aliphatic hydrocarbon radical such as vinyl, allyl, hexenyl or propargyl; any cycloaliphatic hydrocarbon radical such as, cyclohexenyl, cyclopentyl, cyclohexyl and methylcyclohexyl; any aromatic hydrocarbon radical such as phenyl, xenyl, naphthyl, tolyl or xylyl, and any aralkyl hydrocarbon radical such as benzyl, β-phenylethyl, and gamma-phenylpropyl. R can also be any monovalent halohydrocarbon radical such as chloromethyl, trifluoropropyl, $C_3F_7CH_2CH_2$—, chlorophenyl, bromoxenyl, α,α,α-trifluorotolyl, chlorobenzyl, trifluorovinyl, chlorocyclohexyl and tetrachlorophenyl.

The compositions of this invention in which X is chlorine or acetoxy are best prepared by reacting 2 mols of a silane of the formula $R_2SiX_2$ with one mol of a silane diol of the formula $R_2Si(OH)_2$. This reaction is best carried out in the presence of an acid acceptor, such as pyridine, α-picoline, tributylamine, di-n-hexylamine or cyclohexylamine.

The acid acceptor should be present in slight molar excess over that required to react with all of the HCl or acetic acid formed during the reaction. The reaction is represented by the equation $$2R_2SiX_2 + R_2Si(OH)_2 \longrightarrow \begin{matrix}R_2 & R_2 & R_2\\X\text{Si}O\text{Si}O\text{Si}X\end{matrix} + 2HX$$

The variations in the structure of the trisiloxane are brought about by employing silanes and silane diols having different groups substituted on the silicon. If one wishes to prepare a siloxane having two types of siloxane units, then one reacts a silane with a silane diol having substituent R groups, differing from those of the silane. In those cases where one wishes to prepare a trisiloxane having 3 types of siloxane units, then one reacts a mixture of 2 silanes having different R groups on the silicon with a silane diol having R groups differing from either of the silanes. For example, one can react a mixture of one mol of dimethyldichlorosilane and one mol of phenylmethyldichlorosilane with one mol of diphenylsilane diol to produce the compound $$\begin{matrix} & Me_2 & Ph_2 & Ph \\ ClSi & OSi & OSiCl \\ & & & Me \end{matrix}$$

The reaction of the chloro or acetoxy silane with the silane diol is best carried out in the presence of an inert solvent i.e., one which will not react with the chloro or acetoxy silane, such as hydrocarbons such as toluene, petroleum ether and xylene; ethers such as the dimethyl ether of ethylene glycol, n-butyl ether or diethyl ether; ketones such as acetone or dibutylketone and chlorinated hydrocarbons such as methylenechloride, chlorobenzene or chloroform.

The trisiloxanes in which X is methoxy are prepared by reacting silanes of the formula $$\begin{matrix} & R_2 \\ ClSiOMe \end{matrix}$$

with the silane diols $R_2Si(OH)_2$ in contact with an acid acceptor such as pyridine or other amines. The reaction is best carried out at from 0 to 30° C.

Methoxychlorosilanes can be prepared by mixing one mol of $Me_2SiCl_2$ with one mol of $Me_2Si(OMe)_2$ and allowing the mixture to equilibrate. The equilibration goes at room temperature or above.

The siloxane diols of this invention are best prepared by the careful hydrolysis of the corresponding chloro or acetoxy siloxanes. This hydrolysis is best carried out by adding the chloro or acetoxy siloxane to water containing an acid acceptor such as sodium bicarbonate. The hydrolysis should be carried out under mild temperatures i.e., about room temperature and the trisiloxane diol can be purified by crystallization.

The chlorosilanes employed in the invention are well known commercial materials. The diacetoxysilanes employed as starting materials can be prepared by reacting the corresponding dichlorosilanes with acetic anhydride.

The silane diols employed herein are best prepared by adding the corresponding chlorosilanes to a stoichiometric amount of water in diethylether in the presence of aniline or other amine acid acceptors. This reaction should be carried out at or about 0° C. The solution is then filtered to remove the amine hydrochloride and the resulting filtrate can be used directly to prepare the trisiloxanes of this invention.

In this specification the following abbreviations are employed, Me for methyl, Et for ethyl, Vi for vinyl and Ph for phenyl.

The following examples are illustrative only and should not be construed as limiting the invention which is properly delineated in the appended claims.

EXAMPLE 1

A mixture of 476 g. of phenylmethyldiacetoxysilane in about 200 cc. of diethylether was placed in a container and a solution of 216 g. of diphenylsilanediol, 165 g. of pyridine and 1500 cc. of diethylether was slowly added over a period of 30 minutes. The mixture was heated at reflux for 30 minutes, cooled and filtered.

The ether was removed from the filtrate and the product was distilled to give a 92 percent yield of $$\underset{\text{Me}}{\text{MeCOOSi}} \underset{}{\overset{\text{Ph}}{\text{OSi}}} \underset{\text{Me}}{\overset{\text{Ph}_2}{}} \overset{\text{Ph}}{\text{OSiOOCMe}}$$

boiling at 245° C. at 2 mm.

EXAMPLE 2

Employing the procedure of Example 1, the following silanes were reacted with the following silane diols to give the trisiloxanes shown in the table below:

*Table I*

| Acetoxy Silane | Silane Diol | Trisiloxane | B.P., °C./mm. |
|---|---|---|---|
| Me₂Si(OOCMe)₂ | Ph₂Si(OH)₂ | $\overset{\text{Me}_2}{\text{MeCOOSi}} \overset{\text{Ph}_2}{\text{OSi}} \overset{\text{Me}_2}{\text{OSiOOCMe}}$ | 160/2 |
| Me₂Si(OOCMe)₂ | MeViSi(OH)₂ | $\overset{\text{Me}_2}{\text{MeCOOSi}} \overset{\text{Me}}{\underset{\text{Vi}}{\text{OSi}}} \overset{\text{Me}_2}{\text{OSiOOCMe}}$ | 160/68 |
| Ph₂Si(OOCMe)₂ | PhMeSi(OH)₂ | $\overset{\text{Ph}_2}{\text{MeCOOSi}} \overset{\text{Ph}}{\underset{\text{Me}}{\text{OSiOSi}}} \overset{\text{Ph}_2}{\text{OOCMe}}$ | 300/2 |

EXAMPLE 3

A mixture of 2 mols of dimethyldichlorosilane and 95 g. of α-picoline in about 500 cc. of diethylether was placed in a container and cooled in an ice bath as a solution of .5 mol of phenylmethylsilanediol in a mixture of 500 cc. of ether and 95 g. of aniline was added slowly over a period of 2 hours. The mixture was stirred for a few minutes longer and then filtered and the ether was removed from the filtrate. The product was distilled to give a 69 percent yield of the trisiloxane $$\overset{\text{Me}_2}{\text{ClSi}} \overset{\text{Me}}{\underset{\text{Ph}}{\text{OSiOSi}}} \overset{\text{Me}_2}{\text{Cl}}$$

boiling at 123° C. at 10 mm.

EXAMPLE 4

Employing the procedure of Example 3, the following chlorosilanes were reacted with the following silane diols to produce the following trisiloxanes:

*Table II*

| Chlorosilane | Silane Diol | Trisiloxane | B.P., °C./mm. |
|---|---|---|---|
| Ph₂SiCl₂ | Me₂Si(OH)₂ | $\overset{\text{Ph}_2}{\text{ClSi}} \overset{\text{Me}_2}{\text{OSi}} \overset{\text{Ph}_2}{\text{OSiCl}}$ | 228/1 |
| Me₂SiCl₂ | PhViSi(OH)₂ | $\overset{\text{Me}_2}{\text{ClSi}} \overset{\text{Ph}}{\underset{\text{Vi}}{\text{OSiOSi}}} \overset{\text{Me}_2}{\text{Cl}}$ | 162/20 |
| Me₂SiCl₂ | MeEtSi(OH)₂ | $\overset{\text{Me}_2}{\text{ClSi}} \overset{\text{Me}}{\underset{\text{Et}}{\text{OSi}}} \overset{\text{Me}_2}{\text{OSiCl}}$ | 105/30 |
| Me₂SiCl₂ | $\underset{\underset{\text{Ph}}{\text{CHMe}}}{\overset{\text{Me}}{\text{PhCHCH}_2\text{Si(OH)}_2}}$ | $\overset{\text{Me}_2}{\text{ClSi}} \overset{\text{Me}}{\underset{\underset{\underset{\text{Ph}}{\text{CHMe}}}{\text{CH}_2}}{\text{OSi}}} \overset{\text{Me}_2}{\text{OSiCl}}$ | 128/2 |
| Me₂SiCl₂ | $\overset{\text{Me}}{\text{CF}_3\text{CH}_2\text{CH}_2\text{Si(OH)}_2}$ | $\overset{\text{Me}_2}{\text{ClSi}} \overset{\text{Me}}{\underset{\underset{\underset{\text{CF}_3}{\text{CH}_2}}{\text{CH}_2}}{\text{OSi}}} \overset{\text{Me}_2}{\text{OSiCl}}$ | 105/19 |

EXAMPLE 5

An ether solution of the trisiloxane $$\overset{\text{Me}_2}{\text{MeCOOSi}} \overset{\text{Ph}_2}{\text{OSi}} \overset{\text{Me}_2}{\text{OSi}} \text{OOCMe}$$

was added slowly with stirring to an ice water solution of sodium carbonate. After one hour of agitation the ether solution was washed with water and with sodium carbonate solution until it was neutral. The product was dried over an anhydrous sodium carbonate. The ether was allowed to evaporate giving a crystalline product. The first crop was removed by filtration and the evaporation was continued giving a second crop of crystals. These were the compound $$\text{HOSi}\overset{Me_2}{\ }\text{OSi}\overset{Ph_2}{\ }\text{OSi}\overset{Me_2}{\ }\text{OH}$$

melting at 114 to 117° C.

EXAMPLE 6

When the following acetoxy trisiloxanes were hydrolyzed in accordance with the method of Example 5, the following diols were obtained:

Table III

| Acetoxysilane | Diol | Melting Point, °C. |
|---|---|---|
| $\text{MeCOOSi}\overset{Ph_2}{\ }\text{OSiOSi}\overset{Ph}{\underset{Me}{\ }}\text{OOCMe}\overset{Ph_2}{\ }$ | $\text{HOSi}\overset{Ph_2}{\ }\text{OSiOSi}\overset{Ph}{\underset{Me}{\ }}\text{OH}\overset{Ph_2}{\ }$ | 92–94 |
| $\text{MeCOOSiOSi}\overset{Ph}{\underset{Me}{\ }}\overset{Ph_2}{\ }\text{OSiOOCMe}\overset{Ph}{\underset{Me}{\ }}$ | $\text{HOSiOSi}\overset{Ph}{\underset{Me}{\ }}\overset{Ph_2}{\ }\text{OSiOH}\overset{Ph}{\underset{Me}{\ }}$ | Liquid |

EXAMPLE 7

59 g. of $$\text{ClSi}\overset{Ph_2}{\ }\text{OSi}\overset{Me_2}{\ }\text{OSi}\overset{Ph_2}{\ }\text{Cl}$$

was dissolved in 200 cc. of acetone and the solution was slowly added to a mixture of ice and water containing 26 g. of sodium carbonate. The mixture was stirred for 45 minutes and toluene was added. The toluene layer was washed twice with water, then separated and dried over sodium sulfate. The product crystallized and toluene was added to make a slurry which was filtered. The solid product was washed 3 times with toluene and was found to be the diol $$\text{HOSi}\overset{Ph_2}{\ }\text{OSi}\overset{Me_2}{\ }\text{OSi}\overset{Ph_2}{\ }\text{OH}$$

melting 102 to 103° C.

EXAMPLE 8

When the acetoxy siloxane $$\text{MeCOOSi}\overset{Me_2}{\ }\text{OSiOSi}\overset{Me}{\underset{Vi}{\ }}\overset{Me_2}{\ }\text{OOCMe}$$

is hydrolyzed in accordance with the procedure of Example 5, the diol $$\text{HOSi}\overset{Me_2}{\ }\text{OSiOSi}\overset{Me}{\underset{Vi}{\ }}\overset{Me_2}{\ }\text{OH}$$

is obtained.

EXAMPLE 9

When the following chlorosiloxanes are hydrolyzed in accordance with the procedure of Example 7, the following trisiloxane diols are obtained:

Table IV

| Chlorosiloxane | Diol |
|---|---|
| $\text{ClSi}\overset{Me_2}{\ }\text{OSiOSi}\overset{Ph}{\underset{Me}{\ }}\overset{Me_2}{\ }\text{Cl}$ | $\text{HOSi}\overset{Me_2}{\ }\text{OSiOSi}\overset{Ph}{\underset{Me}{\ }}\overset{Me_2}{\ }\text{OH}$ |
| $\text{ClSi}\overset{Me_2}{\ }\text{OSiOSi}\overset{Ph}{\underset{Vi}{\ }}\overset{Me_2}{\ }\text{Cl}$ | $\text{HOSi}\overset{Me_2}{\ }\text{OSiOSi}\overset{Ph}{\underset{Vi}{\ }}\overset{Me_2}{\ }\text{OH}$ |
| $\text{ClSi}\overset{Me_2}{\ }\text{OSi}\overset{Me}{\underset{Et}{\ }}\text{OSi}\overset{Me_2}{\ }\text{Cl}$ | $\text{HOSi}\overset{Me_2}{\ }\text{OSi}\overset{Me}{\underset{Et}{\ }}\text{OSi}\overset{Me_2}{\ }\text{OH}$ |
| $\text{ClSi}\overset{Me_2}{\ }\text{OSi}\underset{\underset{Ph}{\underset{CHMe}{CH_2}}}{\overset{Me}{\ }}\text{OSi}\overset{Me_2}{\ }\text{Cl}$ | $\text{HOSi}\overset{Me_2}{\ }\text{OSi}\underset{\underset{Ph}{\underset{CHMe}{CH_2}}}{\overset{Me}{\ }}\text{OSi}\overset{Me_2}{\ }\text{OH}$ |
| $\text{ClSi}\overset{Me_2}{\ }\text{OSi}\underset{\underset{CF_3}{\underset{CH_2}{CH_2}}}{\overset{Me}{\ }}\text{OSi}\overset{Me_2}{\ }\text{Cl}$ | $\text{HOSi}\overset{Me_2}{\ }\text{OSi}\underset{\underset{CF_3}{\underset{CH_2}{CH_2}}}{\overset{Me}{\ }}\text{OSi}\overset{Me_2}{\ }\text{OH}$ |
| 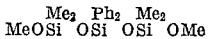 | 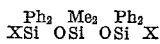 |
| $\text{ClSi}\overset{Me_2}{\ }\text{OSiOSi}\overset{Me_2}{\underset{C_{18}H_{37}}{\ }}\text{Cl}$ | $\text{HOSi}\overset{Me_2}{\ }\text{OSiOSi}\overset{Me_2}{\underset{C_{18}H_{37}}{\ }}\text{OH}$ |
| 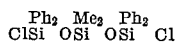 | 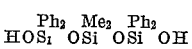 |

EXAMPLE 10

1 mol of dimethylmonochloromethoxysilane was dissolved in 250 cc. of ether and cooled in an ice bath. 0.5 mol of diphenylsilanediol was dissolved in one mol of α-picoline and one liter of diethyl ether. The solution of the diol was added with agitation to the cold solution of the dimethylchloromethoxysilane. The mixture was stirred for 30 minutes, filtered and stripped at 100° C. The product was distilled at reduced pressure to give the compound $$\text{MeOSi}\overset{Me_2}{\ }\text{OSi}\overset{Ph_2}{\ }\text{OSi}\overset{Me_2}{\ }\text{OMe}$$

That which is claimed is:

1. A composition of the formula $$\text{XSi}\overset{Ph_2}{\ }\text{OSi}\overset{Me_2}{\ }\text{OSi}\overset{Ph_2}{\ }\text{X}$$

in which X is selected from the group consisting of chlorine atoms and hydroxyl radicals.

2. A trisiloxane of the formula $$\text{ClSi}\overset{Ph_2}{\ }\text{OSi}\overset{Me_2}{\ }\text{OSi}\overset{Ph_2}{\ }\text{Cl}$$

3. A composition of the formula $$\text{HOSi}\overset{Ph_2}{\ }\text{OSi}\overset{Me_2}{\ }\text{OSi}\overset{Ph_2}{\ }\text{OH}$$

References Cited in the file of this patent

UNITED STATES PATENTS

| | | |
|---|---|---|
| 2,902,507 | Hyde et al. | Sept. 1, 1959 |
| 2,911,427 | Brown | Nov. 3, 1959 |
| 2,915,544 | Holbrook et al. | Dec. 1, 1959 |

FOREIGN PATENTS

| | | |
|---|---|---|
| 816,535 | Great Britain | July 15, 1959 |

OTHER REFERENCES

Daudt et al.: Jour. Am. Chem. Soc., volume 74 (1952), pages 386–90.

Sokolov et al.: Izvest. Akad. Nauk. SSSR, Otdel Khim. Nauk (1957), pages 806–11 (Chem. Abstracts 3, 668).

Sokolov: Zhurnal Obshchei Khim., volume 29 (January 1959), pages 253–63.